United States Patent
Draghetti et al.

(10) Patent No.: US 6,516,589 B1
(45) Date of Patent: Feb. 11, 2003

(54) METHOD AND MACHINE FOR WRAPPING A PRODUCT IN A SHEET OF HEAT-SEAL WRAPPING MATERIAL

(75) Inventors: Fiorenzo Draghetti, Medicina (IT); Luca Federici, Bologna (IT)

(73) Assignee: G. D Societa' per Azioni, Bologna (IT)

( * ) Notice: Subject to any disclaimer, the term of this patent is extended or adjusted under 35 U.S.C. 154(b) by 136 days.

(21) Appl. No.: 09/591,412

(22) Filed: Jun. 12, 2000

(30) Foreign Application Priority Data

Jun. 10, 1999 (IT) .......................... BO99A0316

(51) Int. Cl.[7] .............................. B65B 11/00
(52) U.S. Cl. .................. 53/466; 53/376.7; 53/377.8
(58) Field of Search .................. 53/148, 234, 466, 53/376.7, 377.8, 387.3, 479, 491

(56) References Cited

U.S. PATENT DOCUMENTS 5,177,933 A * 1/1993 Boriani et al. ................ 53/228
5,406,775 A * 4/1995 Tacchi et al. .................. 53/234
5,477,661 A * 12/1995 Draghetti et al. ............. 53/234
5,533,323 A * 7/1996 Osti et al. ..................... 53/225
5,613,344 A * 3/1997 Osti et al. ..................... 53/228
5,839,253 A * 11/1998 Draghetti ..................... 53/234

FOREIGN PATENT DOCUMENTS

DE 3046709 10/1981
EP 0795474 9/1997

* cited by examiner

*Primary Examiner*—Scott A. Smith
*Assistant Examiner*—Chukwurah Nathaniel
(74) *Attorney, Agent, or Firm*—Ladas & Parry

(57) ABSTRACT

A method and machine for wrapping a product in a sheet of heat-seal wrapping material, whereby the product is wrapped in the sheet of wrapping material to form a product having an outer wrapping in turn having three distinct overlap portions, i.e. portions having at least two superimposed layers of the sheet of wrapping material; and the outer wrapping is stabilized, as the product is conveyed continuously inside a respective same pocket, by a seal formed at each of the three overlap portions.

13 Claims, 3 Drawing Sheets

METHOD AND MACHINE FOR WRAPPING A PRODUCT IN A SHEET OF HEAT-SEAL WRAPPING MATERIAL

The present invention relates to a method of wrapping a product in a sheet of heat-seal wrapping material.

The present invention is particularly advantageous for use on machines for cellophaning packets of cigarettes, to which the following description refers purely by way of example.

BACKGROUND OF THE INVENTION

Known machines for cellophaning packets of cigarettes normally comprise a step-operated first wrapping wheel on which a sheet of heat-seal wrapping material is wound about a packet of cigarettes to form a tubular wrapping, which is stabilized by means of a longitudinal seal, and which comprises two tubular end portions, each projecting from a respective end wall of the packet. The longitudinal seal is made by a sealing device mounted at a fixed sealing station, and which, at each stop of the first wrapping wheel, is brought into contact with a longitudinal overlap portion of two opposite portions of the sheet of wrapping material.

At the output of the first wrapping wheel, the packet and respective tubular wrapping are normally fed through a folding station where the projecting tubular portions of the tubular wrapping are folded onto respective end walls to form two further overlap portions closing the ends of an outer overwrapping. The two overlap portions are then stabilized by two end seals as the packet is conveyed on a continuously operated second wrapping wheel.

Finally, the overwrapped packet is normally fed to an output station where it is normally heat treated to shrink the outer wrapping about the packet.

Known cellophaning machines of the type described above have several drawbacks, mainly due to the fact that, over and above a given operating speed, the stops of the first wrapping wheel are not long enough to enable correct execution of the longitudinal seal.

Moreover, a further drawback of known cellophaning machines of the type described above lies in the longitudinal seal being made separately from the end seals, which means the tubular wrapping, at the output of the first wrapping wheel, may undergo localized heat shrinking at the longitudinal overlap portion only, thus impairing correct formation of the outer wrapping by shortening and tightening the overlap portion with respect to the rest of the tubular wrapping.

SUMMARY OF THE INVENTION

It is an object of the present invention to provide a method of wrapping a product in a sheet of heat-seal wrapping material, designed to eliminate the aforementioned drawbacks.

According to the present invention, there is provided a method of wrapping a product in a sheet of heat-seal wrapping material, the method comprising the steps of wrapping the product in said sheet of wrapping material to form a tubular wrapping comprising a longitudinal first overlap portion, defined by superimposed portions of said sheet of wrapping material, and two projecting tubular end portions; folding each of said tubular end portions onto the product to form an outer wrapping having two further end overlap portions; and feeding said product along a sealing path, along which, said three overlap portions are stabilized by three sealing operations; and being characterized in that said product is fed along said sealing path by a respective same pocket, which is fed continuously along the sealing path.

The present invention also relates to a machine for wrapping a product in a sheet of heat-seal wrapping material.

According to the present invention, there is provided a machine for wrapping a product in a sheet of heat-seal wrapping material, the machine comprising first wrapping means for wrapping the product in said sheet of wrapping material and forming a tubular wrapping comprising a longitudinal first overlap portion, defined by superimposed portions of the sheet of wrapping material, and two projecting tubular end portions; second wrapping means for folding each said tubular end portion to form an outer wrapping having two further end overlap portions; sealing means located along a sealing path, and each for performing a respective sealing operation on a respective said overlap portion; and conveying means for feeding said product along said sealing path; and being characterized in that said conveying means comprise a single conveying pocket for said product; first actuating means being provided to feed said pocket continuously along said sealing path.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
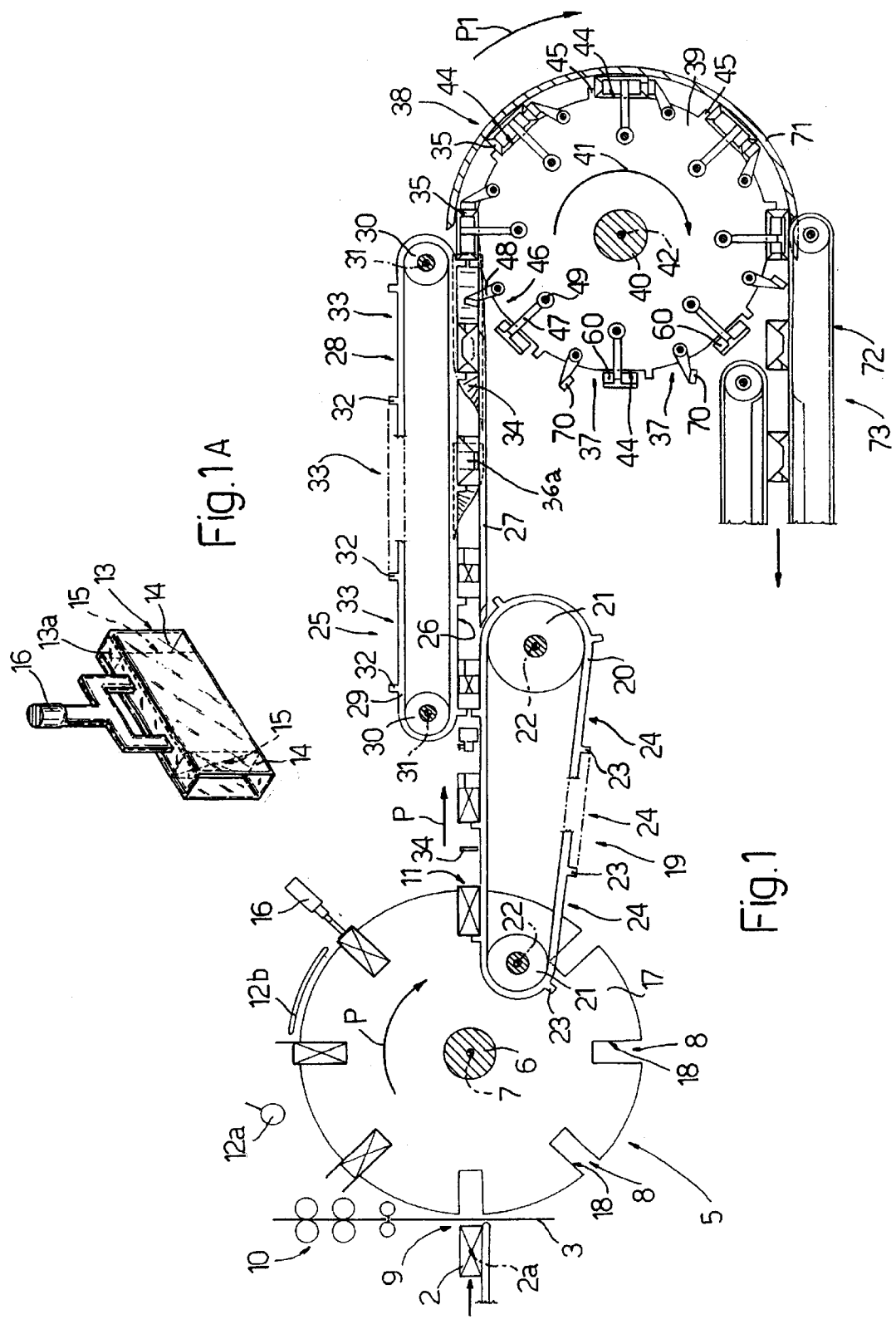
FIG. 1 shows a schematic side view, with parts enlarged and parts removed for clarity, of a preferred embodiment of the machine according to the present invention.

Number 1 in FIG. 1 indicates as a whole a cellophaning machine for wrapping packets 2 of cigarettes in respective sheets 3 of transparent heat-seal wrapping material.

Machine 1 comprises a wrapping wheel 5 fitted to a powered shaft 6, which is mounted to rotate in steps and in a given direction (clockwise in FIG. 1) about an axis 7 perpendicular to the FIG. 1 plane.

Wheel 5, of known type, comprises a number of pockets 8, which are equally spaced along the periphery of wheel 5, are substantially U-shaped, and are open both radially and axially outwards.

When stopped at a loading station 9, each pocket 8 receives a respective sheet 3 of wrapping material fed to station 9 by a known supply device 10, and a respective packet 2, which is inserted inside respective pocket 8 to fold sheet 3 into a U about packet 2.

In connection with the above, it should be pointed out that, on machine 1, packet 2 is fed by wheel 5, and by successive conveying devices described later on, along a wrapping path P with the longitudinal axis 2a of the packet oriented crosswise at all times to path P and to the FIG. 1 plane.

As packet 2 and respective sheet 3 are fed by wheel 5 between loading station 9 and an unloading station 11, sheet 3 is wrapped about packet 2 (as of said U-shaped configuration) by two known folding devices 12a and 12b to form a tubular wrapping 13, which comprises a longitudinal overlap portion 13a, defined by two superimposed portions of sheet 3, and two tubular end portions 14, each of which projects from a respective end wall 15 of packet 2.

When wheel 5 is stopped, longitudinal overlap portion 13a is pre-stabilized by means of a spot seal made by a sealing device 16, which is substantially fork-shaped, is mounted at a fixed sealing station, and is activated in known manner to move back and forth linearly to and from wheel 5 in a substantially radial direction to effect said spot seal.

Wheel 5 comprises, in known manner, two coaxial, parallel disks 17 (only one shown in FIG. 1) fitted to shaft 6 and each comprising a number of peripheral seats 18, each of which defines a respective pocket 8 together with a corresponding seat 18 on the other disk 17.

Machine 1 also comprises an endless conveyor 19 in turn comprising a belt 20 looped about two pulleys 21—one of which is powered continuously—having respective axes 22 parallel to axis 7 of wheel 5. Belt 20 comprises a number of push members 23 equally spaced along belt 20 and defining a succession of pockets 24, the length of each of which is at least equal to the width of a packet 2 measured parallel to path P.

At said unloading station 11, conveyor 19 extends between disks 17 of wheel 5 to enable one of push members 23 to extract a respective packet 2 and respective tubular wrapping 13 from respective pocket 8, and feed packet 2 and tubular wrapping 13 through an input portion of a folding station 25, which is defined partly by conveyor 19 and partly by a channel 26 located in series with conveyor 19 and defined at the bottom by a horizontal plate 27, and at the top by a bottom conveying branch of an endless conveyor 28.

Conveyor 28 comprises a belt 29 looped about two pulleys 30—one of which is powered continuously having respective axes 31 parallel to axes 22. Belt 29 comprises a number of push members 32 equally spaced along belt 29 and defining a succession of pockets 33, each of which is fed forwards in time with a pocket 24 of conveyor 19 to receive packet 2 and tubular wrapping 13 housed inside pocket 24, and feed packet 2 and tubular wrapping 13 through an output portion of folding station 25.

For each of the two tubular portions 14, station 25 comprises a series of known folding devices 34 for folding the relative tubular portion 14 in known manner onto the respective end wall 15 of respective packet 2, so that, along station 25, an overwrapped packet 35 is formed comprising a closed outer wrapping 36 having two end overlap portions 36a, each defined by a number of superimposed portions of sheet 3 of wrapping material.

At the output of station 25, overwrapped packet 35 is transferred, as described later on, from respective pocket 33 to a pocket 37 of a sealing wheel 38. Sealing wheel 38 comprises, in known manner, two coaxial, parallel drums 39 fitted, a given distance apart, to a powered shaft 40 rotated continuously and in a given direction 41 (clockwise in FIG. 1) about an axis 42 parallel to axis 7 of wheel 5.

Pockets 37 are equally spaced along the periphery of wheel 38, are fed forwards in time with pockets 33, and each comprise, for each of the two drums 39, a respective substantially flat supporting surface 44 formed on the outer surface of relative drum 39, and a respective push member 45, which projects radially from the outer surface of relative drum 39 to engage the rear of respective overwrapped packet 35. Each pocket 37 also comprises a respective gripping and sealing device 46 for retaining respective overwrapped packet 35 inside pocket 37 and in contact with both respective push member 45 and respective supporting surface 44.

In connection with the above, it should be pointed out that overwrapped packet 35 is fed into respective pocket 37 "flat", i.e. with two major lateral surfaces of the packet positioned horizontally, with axis 2a oriented crosswise to path P, and with longitudinal overlap portion 13a located frontwards in direction 41.

Figure 2:
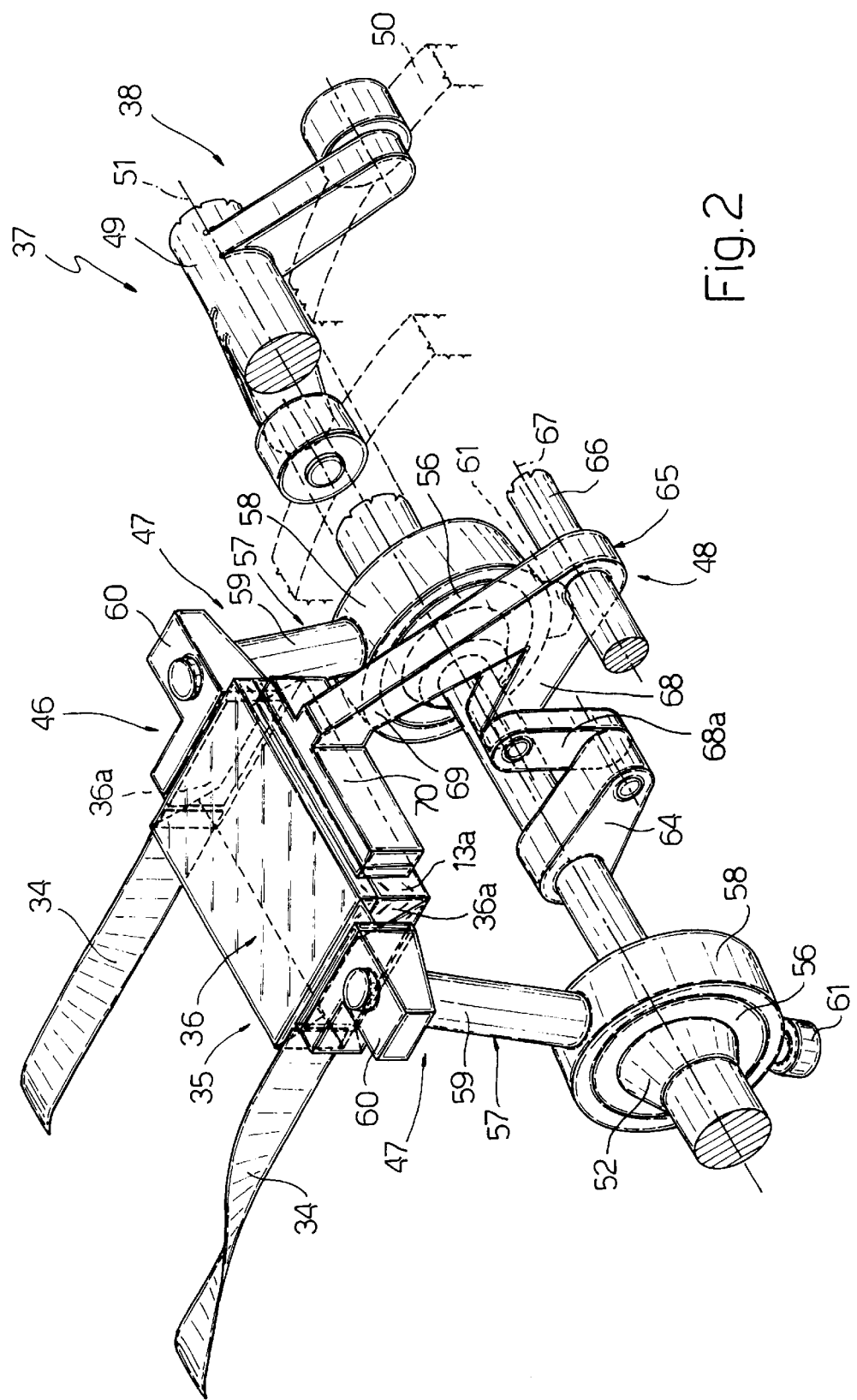
FIG. 2 shows an enlarged view in perspective of a detail in FIG. 1.

With reference to FIG. 2, each gripping and sealing device 46 comprises two lateral jaws 47 located on opposite sides of path P; and a transverse jaw 48 located crosswise to path P and to the front of lateral jaws 47 in direction 41. Jaws 47 and 48 are supported by a shaft 49, which is mounted for rotation through the two drums 39, and is oscillated—with respect to drums 39 and by a known cam device 50 housed inside one of drums 39—about an axis 51 parallel to axis 42.

Figure 3:
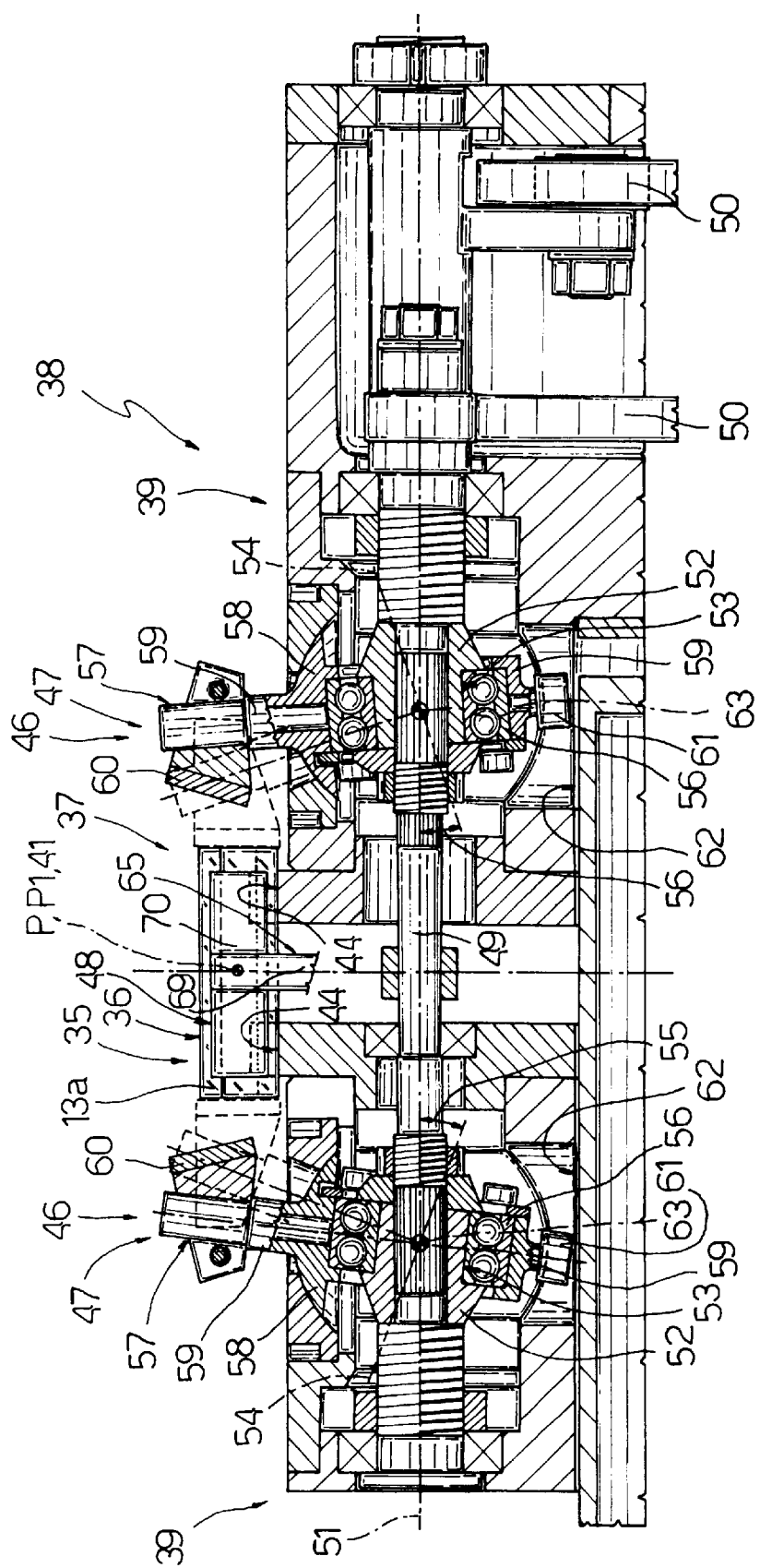
FIG. 3 shows an axial section of the FIG. 2 detail.

With reference to FIG. 3, the two lateral jaws 47 are positioned facing each other, and each comprise a respective tubular body 52 fitted to shaft 49 and having a cylindrical outer surface 53, the axis 54 of which forms a given angle 55 with axis 51. Each jaw 47 also comprises a ball bearing 56 having an inner ring fitted to surface 53 of tubular body 52; and a bar 57 in turn comprising a central hub 58 fitted to an outer ring of bearing 56, and two opposite arms 59 extending radially outwards from hub 58. The two arms 59 are fitted respectively, on the free ends, with a known sealing device 60, and a tappet roller 61 fitted in rotary manner to respective arm 59 and engaging a track 62, which is formed on relative drum 39 and is parallel to axis 51 of shaft 49 and crosswise to path P.

When shaft 49 oscillates about axis 51, bar 57 would therefore also oscillate about axis 51 if it were not forced, by track 62 and by angle 55 formed between axes 51 and 54, to oscillate about an axis 63 extending perpendicular to the FIG. 3 plane at the intersection of axes 51 and 54.

Transverse jaw 48 comprises a crank 64 fitted to shaft 49, between tubular bodies 52 of the two lateral jaws 47, and connected to a rocker arm 65 fitted to a shaft 66, the opposite ends of which are mounted for rotation through the two drums 39 to enable shaft 66 to rotate, with respect to the two drums 39 and by virtue of said cam device 50, about an axis 67 parallel to axis 51. Rocker arm 65 comprises a first arm 68 connected in rotary manner, via the interposition of a connecting rod 68a, to the free end of crank 64; and a second arm 69 supporting a known sealing device 70 extending crosswise to direction 41 and to path P.

In actual use, overwrapped packet 35 is fed to the output of folding station 25 inside respective pocket 33 and in time with a respective pocket 37. At the output of station 25, when shaft 49 is oscillated about axis 51 and portions of folding devices 34 are still positioned engaging outer wrapping 36, the two lateral jaws 47 and transverse jaw 48 are all moved simultaneously from a detached position to a gripping position (FIG. 2) in which sealing devices 60 and sealing device 70 are respectively positioned contacting overlap portions 36a and overlap portion 13a, so as to clamp overwrapped packet 35 inside respective pocket 37 and stabilize outer wrapping 36 by means of two end seals at overlap portions 36a and a longitudinal edge seal at overlap portion 13a.

Jaws 47 and 48 are maintained in the gripping position along the whole of sealing path P1, which forms part of wrapping path P and extends along a curved plate 71 extending, from the output of folding station 25, along an arc of about 180° about the periphery of sealing wheel 38.

At the output of wheel 38, jaws 47 and 48 are moved into the detached position to unload overwrapped packet 35 onto the top conveying branch of an output conveyor 72 forming part of a heat-shrink device 73 for heat treating overwrapped packet 35 to shrink sheet 3 of wrapping material about packet 2.

What is claimed is:

1. A method of wrapping a product in a sheet of heat-seal wrapping material, the method comprising the steps of wrapping the product (2) in said sheet of wrapping material (3) to form a tubular wrapping (13) comprising a longitudinal first overlap portion (13a), defined by superimposed portions of said sheet of wrapping material (13), and two projecting tubular end portions (14); folding each of said tubular end portions (14) onto the product (2) to form an outer wrapping (36) having said longitudinal first overlap portion and two further end overlap portions (36a); and feeding said product (2) along a sealing path (P1), along which, said three overlap portions (13a, 36a) are stabilized by three sealing operations; wherein said product (2) is fed along said sealing path (P1) by a respective pocket (37), which is fed continuously along the sealing path (P1) and on which said three overlap portions are sealed by said three sealing operations.

2. A method as claimed in claim 1, wherein said first overlap portion (13a) is pre-stabilized by a further spot sealing operation prior to the sealing operation on said sealing path.

3. A method as claimed in claim 1, wherein said three sealing operations are performed simultaneously by respective longitudinal (70) and end (60) sealing means.

4. A method as claimed in claim 3, wherein said end and longitudinal sealing means (60, 70) are maintained contacting the respective said overlap portions (36a, 13a) substantially throughout the travel of said product (2) along said sealing path (P1).

5. A method as claimed in claim 3, wherein each said tubular end portion (14) is folded by respective wrapping means (34); said end sealing means (60) being brought into engagement with the respective said further end overlap portions (36a) when said wrapping means (34) are still positioned engaging the respective tubular end portions (14).

6. A method as claimed in claim 1, wherein said product (2) is fed along said sealing path (P1) with a longitudinal axis (2a) of the product oriented crosswise to a traveling direction (41) of the product (2), and with said first overlap portion (13a) located frontwards in said traveling direction (41), and the two said further end overlap portions (36a) located on opposite sides of the sealing path (P1).

7. A method as claimed in claim 6, wherein said product (2) is fed along said sealing path (P1) gripped by a gripping device (46) movable along the sealing path (P1) with said product and which comprises two lateral jaws (47) located on opposite sides of the sealing path (P1) and each engaging a respective said further end overlap portion (36a), each said lateral jaw (47) comprising respective end sealing means (60) for stabilizing the respective said further end overlap portion (36a); and a transverse jaw (48) located in front of said two lateral jaws (47) in said traveling direction (41), said transverse jaw (48) engaging said first overlap portion (13a) and comprising longitudinal sealing means (70) for stabilizing said first overlap portion (13a).

8. A machine for wrapping a product in a sheet of heat-seal wrapping material, the machine comprising first wrapping means (5) for wrapping the product (2) in said sheet of wrapping material (3) and forming a tubular wrapping (13) comprising a longitudinal first overlap portion (13a), defined by superimposed portions of the sheet of wrapping material (3), and two projecting tubular end portions (14); second wrapping means (34) for folding each said tubular end portion (14) to form an outer wrapping (36) having two further end overlap portions (36a); sealing means (60, 70) located along a sealing path (P1), and each for performing a respective sealing operation on a respective said overlap portion (36a, 13a); and conveying means (38) for feeding said product (2) along said sealing path (P1); wherein said conveying means (38) comprises a single conveying pocket (37) for said product (2); first actuating means (40) for feeding said pocket (37) continuously along said sealing path (P1), said sealing means being positioned at said sealing path to seal said first overlap portion and said two end overlap portions as said product advances on said sealing path.

9. A machine as claimed in claim 8, comprising further sealing means (16) for pre-stabilizing said first overlap portion (13a) by means of a spot seal.

10. A machine as claimed in claim 8, wherein said sealing means (60, 70) comprise two end sealing devices (60) located parallel to and on opposite sides of said sealing path (P1), and a longitudinal sealing device (70) located crosswise to said sealing path (P1); second actuating means (40, 50) being provided to move said two end sealing devices (60) and said longitudinal sealing device (70) simultaneously into a griping position in which said two end sealing devices and said longitudinal sealing devices (60, 70) are positioned contacting the respective said overlap portions (36a, 13a).

11. A machine as claimed in claim 10, wherein said second actuating means (49, 50) comprises cam means (50) for maintaining said two end sealing devices and said longitudinal sealing device (60, 70) in said gripping position substantially throughout the travel of the product (2) along said sealing path (P1).

12. A machine as claimed in claim 10, wherein said second wrapping means (34) and said two end sealing devices (60) are so arranged as to all engage said outer wrapping (36) at an input of said sealing path (P1).

13. A machine as claimed in claim 8, wherein said product (2) is positioned, along said sealing path (P1), with a longitudinal axis (2a) of the product oriented crosswise to a traveling direction (41) of the product (2), and with said first overlap portion (13a) located frontwards in said traveling direction (41), and the two said further end overlap portions (36a) located on opposite sides of the sealing path (P1); the machine further comprising a gripping device (46) movable along the sealing path (P1) and which comprises two lateral jaws (47) located on opposite sides of the sealing path (P1) and each engaging a respective said further end overlap portion (36a), each said lateral jaw (47) comprising respective end sealing means (60) for stabilizing the respective said further end overlap portion (36a); and a transverse jaw (48) located in front of said two lateral jaws (47) in said traveling direction (41), said transverse jaw (48) engaging said first overlap portion (13a) and comprising longitudinal sealing means (70) for stabilizing said first overlap portion (13a).

* * * * *

UNITED STATES PATENT AND TRADEMARK OFFICE
CERTIFICATE OF CORRECTION

PATENT NO. : 6,516,589 B1
DATED : February 11, 2003
INVENTOR(S) : Fiorenzo Draghetti et al.

It is certified that error appears in the above-identified patent and that said Letters Patent is hereby corrected as shown below:

<u>Title page,</u>
Item [*] Notice, "136" should read -- 201 --.

Signed and Sealed this

Twenty-fifth Day of May, 2004

JON W. DUDAS
*Acting Director of the United States Patent and Trademark Office*